United States Patent
Ortega

Patent Number: 6,157,910
Date of Patent: Dec. 5, 2000

[54] DEFERRED CORRECTION FILE TRANSFER FOR UPDATING A SPEECH FILE BY CREATING A FILE LOG OF CORRECTIONS

[75] Inventor: Kerry A. Ortega, Deerfield Beach, Fla.

[73] Assignee: International Business Machines Corporation, Armonk, N.Y.

[21] Appl. No.: 09/144,013

[22] Filed: Aug. 31, 1998

[51] Int. Cl.[7] .................................................. G10L 15/00
[52] U.S. Cl. ........................ 704/231; 704/251; 704/235; 704/243; 707/533
[58] Field of Search ................................. 704/9, 23, 251, 704/235, 260, 270, 243, 275; 707/532, 533

[56] References Cited

U.S. PATENT DOCUMENTS

| | | | |
|---|---|---|---|
| 4,829,576 | 5/1989 | Porter | 704/251 |
| 5,127,055 | 6/1992 | Larkey | 704/270 |
| 5,185,887 | 2/1993 | Takahashi et al. | 395/600 |
| 5,787,230 | 7/1998 | Lee | 704/235 |
| 5,864,805 | 1/1999 | Chen et al. | 704/235 |
| 5,875,443 | 2/1999 | Nielsen | 707/2 |
| 5,883,986 | 3/1999 | Kopec et al. | 382/310 |
| 5,907,825 | 5/1999 | Tzirkel-Hancock | 704/243 |
| 5,970,451 | 10/1999 | Lewis et al. | 704/251 |
| 6,023,678 | 2/2000 | Lewis et al. | 704/260 |

*Primary Examiner*—Curtis A. Kuntz
*Assistant Examiner*—Vijay B Chawan

[57] ABSTRACT

A method for updating an original speaker's speech file in a speech application, comprises the steps of: creating a recognition file during a speech recognition session using the original speaker's language model on a first machine and with a first user identification; copying the recognition file; creating a file log of corrections, including changes to the language model and baseforms for newly added words, during a correction session utilizing the copied recognition file and out of association with the original speaker's language model in the first machine with the first user identification; and, copying the changes to the language model and the baseforms for newly added words from the file log back to the original speaker's speech file on the first machine using the first user identification. The copied recognition file can be opened and corrected on a second machine or with a second user identification.

12 Claims, 1 Drawing Sheet

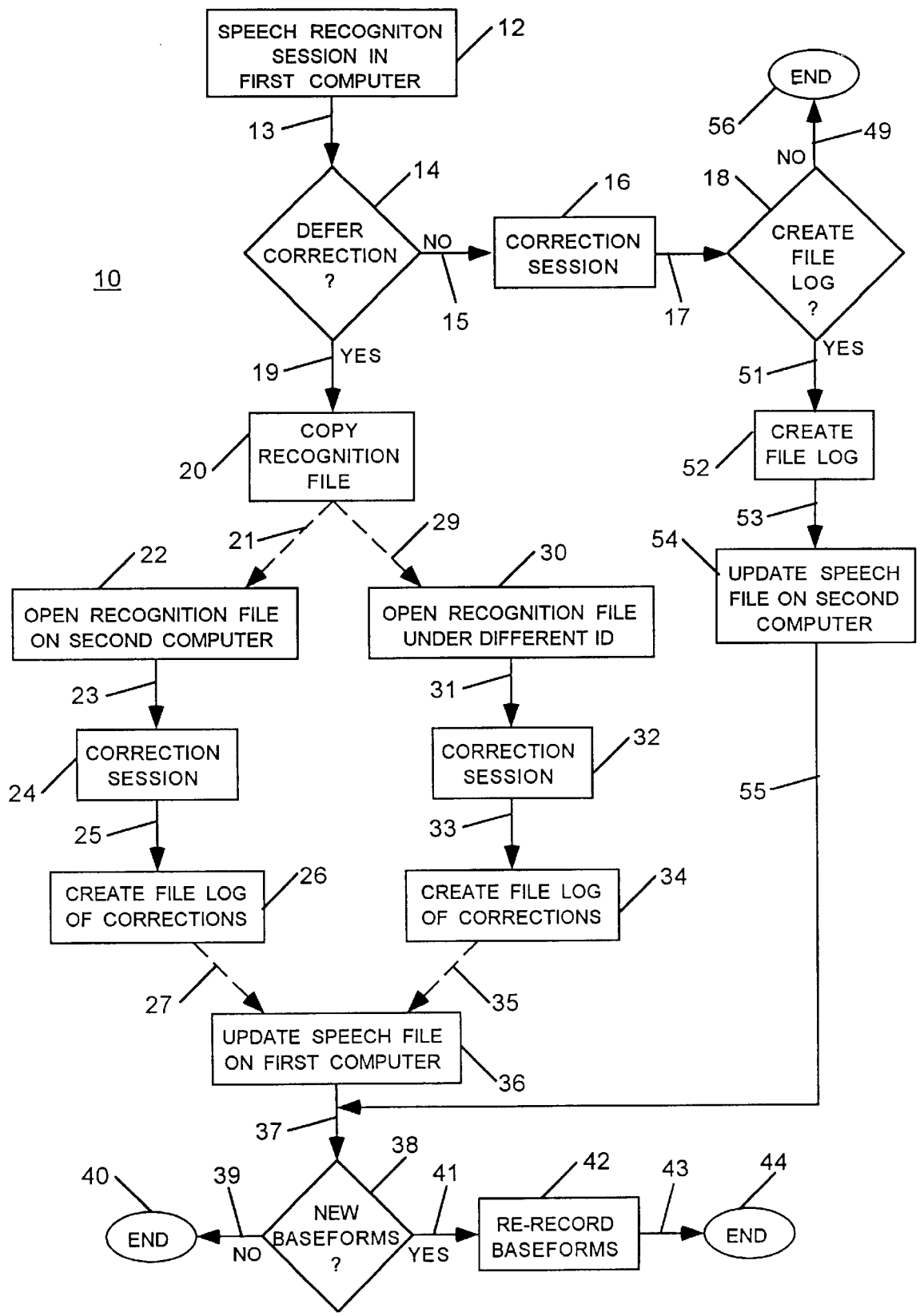

DEFERRED CORRECTION FILE TRANSFER FOR UPDATING A SPEECH FILE BY CREATING A FILE LOG OF CORRECTIONS

BACKGROUND OF THE INVENTION

1. Field of the Invention

This invention relates to the field of speech recognition, and in particular, to a method for updating an original speaker's speech file when misrecognitions of speech are corrected by other persons or on other computers.

2. Description of Related Art

Users need to correct the misrecognition errors made by speech recognition engines in speech applications in order to improve recognition in subsequent speech recognition sessions. If words are not in the speech vocabulary, the user must add them to the system's vocabulary and provide a pronunciation for the words. The pronunciation of each word is stored as a baseform. Through the correction of the document using the speech system's correction facility, the system improves its recognition with each use.

One feature of some speech applications is allowing the user to defer speech correction until a later time. Deferring the correction until later allows someone other than the person who dictated the text to correct the text.

Others can correct the document on another computer system, but they cannot update the original speaker's speech files. The original speaker can correct the document on another computer system having the same speech application, for example one at home rather than in the office, or vice versa, but this also cannot correct the original speaker's speech files. In either case, the original user's speech recognition engine is not improved by the correction process, which is critical for long term success in use of a speech recognition application. Ideally, the user wants to keep all speech systems synchronized with one another, as well as allow others to update their speech systems. Accordingly, a long felt need exists for a method to update an original speaker's speech file when correction is undertaken by another person or when correction takes place on another computer system, by the original speaker or by another person.

SUMMARY OF THE INVENTION

In accordance with the inventive arrangements, when a user makes corrections to a document, the corrections for the document are logged into a file, which contains a log of the corrections. The file log identifies changes to the language model and any new words added through correction. The user can take this log to another system. Then by invoking an Update Speech File command, for example from a menu, the system reads the log and performs the same corrections to the original speaker's speech files as was performed on the other system.

A method for updating an original speaker's speech file in a speech application, in accordance with the inventive arrangements, comprises the steps of: (a) creating a recognition file during a speech recognition session using the original speaker's language model on a first machine and with a first user identification; (b) copying the recognition file; (c) creating a file log of corrections, including changes to the language model and baseforms for newly added words, during a correction session utilizing the copied recognition file and out of association with the original speaker's language model in the first machine with the first user identification; and, (d) copying the changes to the language model and the baseforms for newly added words from the file log back to the original speaker's speech file on the first machine using the first user identification.

The method can comprise the step of opening the copied recognition file on a second machine, prior to the step of creating the file log.

Alternatively, the method can comprise the step of opening the copied recognition file with a second user identification, prior to the step of creating the file log.

All of the steps can be performed by the original speaker. Alternatively, some of the steps can be performed by the original speaker and others of the steps can be performed by at least one person other than the original speaker. More particularly, step (a) can be performed by the original speaker; and, step (c) can performed by a person other than the original speaker.

The method can further comprise the step of: (e) re-recording the baseforms for the newly added words. Re-recording the baseforms is an appropriate step for the original speaker when the corrections have been made by another person.

A further method for updating an original speaker's speech file in a speech application, in accordance with the inventive arrangements, comprises the steps of: (a) creating a recognition file during a speech recognition session using said original speaker's language model on a first machine and with a first user identification; (b) correcting misrecognition errors from said speech recognition session; (c) creating a file log of corrections, including changes to said language model and baseforms for newly added words, during said correction session; and, (d) updating a recognition file on a second machine.

The method can further comprise the step of: (e) re-recording baseforms for newly added words.

BRIEF DESCRIPTION OF THE DRAWINGS

The sole FIGURE is a flow chart illustrating a method for updating an original speaker's speech file in accordance with the inventive arrangements.

DETAILED DESCRIPTION OF THE PREFERRED EMBODIMENTS

A method for updating an original speaker's speech file in a speech application is illustrated by flow chart 10 in the sole FIGURE. The method begins with the step of block 12, in accordance with which an original speaker undertakes a speech recognition session with a speech application resident in a first machine and with a first user identification, namely the original speaker's identification. When the speech recognition session is concluded, path 13 leads to decision step of block 14. If the user, in this case the original speaker, does not want to defer correction, the method branches on path 15 to block 16, in accordance with which the speech misrecognitions are corrected in a correction session. When the correction session is concluded, path 17 lead to the step of decision block 18, in accordance with which a determination is made as to whether to create a file log. If not, the method branches on path 49 and thereafter terminates with the end step of block 56. An explanation of the steps following a decision to create a file log in accordance with the step of block 18 is best deferred until after the description of the steps following a decision to defer correction.

If the original speaker does want to defer correction, the method branches on path 19 to block 20, in accordance with which the recognition file created during the recognition session is copied. At this point, there are basically two alternatives, represented by paths 21 and 29. A further alternative, at an earlier decision point, is represented by the steps following a decision to create a file log in accordance with the step of block 18.

A first alternative is that the original speaker or a person other than the original speaker will undertake a correction session on a different machine, that is, a different computer. In this case, it does not matter whether or not a different system user identification is used because the original speaker's speech file in the different machine is in any case different from the original speaker's speech file in the first machine. It also does not matter, except in connection with step 42 explained hereinafter, whether or not the steps following path 22 are performed by the original speaker or the other person. Path 21 lead to the first alternative.

Path 21 leads to the step of block 22, in accordance with which the copied recognition file is opened on a second computer. Path 23 leads to the step of a correction session in accordance with block 26. After the correction session concludes, path 25 leads to the step of block 26, in accordance with which a file log of corrections is created. The file log of corrections includes changes to the language model and baseforms for newly added words. Text-to-Speech (TTS) generation is used to create baseforms for newly added words.

A second alternative is that a person other than the original speaker will undertake a correction session using a different system user identification. This assumes that the original speaker is not expected to stay on the same machine and log on with a different system user identification, although that is a possibility even if reasons for such are not clear. In this case, it does not matter whether or not a different machine is used because the speech file accessed by the different system user identification is in any case different from the original speaker's speech file accessed by the original speaker's system user identification in the first machine. It also does not matter, except in connection with step 42 explained hereinafter, whether or not the steps following path 22 are performed by the original speaker or the other person, although performance by the original speaker is unlikely. Path 29 leads to the first alternative.

Path 29 leads to the step of block 30, in accordance with which the copied recognition file is opened under a different system user identification. Path 31 leads to the step of a correction session in accordance with block 32. After the correction session concludes, path 33 leads to the step of block 34, in accordance with which a file log of corrections is created. The file log of corrections includes changes to the language model and baseforms for newly added words. Text-to-Speech (TTS) generation is used to create baseforms for newly added words.

Each of paths 27 and 35 leads to block 36, in accordance with which the speech file of the original speaker on the first computer is updated with the information in the file log of corrections, created in the steps of blocks 26 or 34. This step can be implemented, for example, by choosing an Update Speech File menu item. The system looks at the file log and performs the same corrections to the original speaker's speech file as was performed on the other system or with the other system user identification. The copying is an addendum step, since the information in the speech file is to be updated, not replaced.

Path 37 leads to the decision step of block 38, which asks if new baseforms are needed. If the file log contains corrections not dictated by the original speaker, the original speaker can choose to follow path 41 to the step of block 42, in accordance with which the original speaker can re-record the newly added words to create baseforms in the original speaker's voice. After re-recording, path 43 lead to the step of block 44, in accordance with which the method ends. If the file log contains corrections dictated by the original speaker, the original speaker most likely has no need to re-record the newly added words. In this case, path 39 leads to block 40, in accordance with which the method ends.

In the further alternative, and following a decision to create a file log in accordance with the step of block 18, the method branches on path 51 to the step of block 52, in accordance with which a file log is created. Path 53 then leads to the step of block 54, in accordance with which the speech file on the second computer is updated. Thereafter, path 55 leads to the step of decision block 38, which has already been explained in detail.

All of the steps can be performed by the original speaker, or some of the steps can be performed by the original speaker and others of the steps can be performed by at least one person other than the original speaker. More particularly, the steps of blocks 12, 14, 16, 24, 42, 52 and 54 can be expected to be performed by the original speaker. Steps 30, 32 and 34 can be expected to be performed by a person other than the original speaker. Whether or not the original speaker or a person other than the original speaker performs the remaining steps will depend upon situations and circumstances beyond the scope of easy prediction. In one possible scenario, the original speaker performs the steps of blocks 12, 14, 20, 22, 24, 26, 36, 38 and 40. In another possible scenario, the original speaker performs the steps of blocks 12, 14 and 20; another person then performs the steps of blocks 30, 32, 34 and 36; and the original speaker then performs the steps of blocks 38, 42 and 44. In a third possible scenario, the original speaker performs the steps of blocks 12, 14, 16, 18, 52, 54, 38 and 42. Many other scenarios can be imagined, including those not strictly in accordance with the flow chart 10, but nevertheless in accordance with the inventive arrangements.

The inventive arrangements provide a method by which another user can correct a speech document and still update the original speaker's speech files. These methods also allow a user to keep several different speech systems synchronized with one another.

What is claimed is:

1. A method for updating an original speaker's speech file in a speech application, comprising the steps of:
    (a) creating a recognition file during a speech recognition session using said original speaker's language model on a first machine and with a first user identification;
    (b) copying said recognition file;
    (c) creating a file log of corrections, including changes to said language model and baseforms for newly added words, during a correction session utilizing said copied recognition file and out of association with said original speaker's language model in said first machine with said first user identification; and,
    (d) copying said changes to said language model and said baseforms for newly added words from said file log back to said original speaker's speech file on said first machine using said first user identification.

2. The method of claim 1, further comprising the step of opening said copied recognition file on a second machine, prior to said step of creating said file log.

3. The method of claim 1, further comprising the step of opening said copied recognition file with a second user identification, prior to said step of creating said file log.

4. The method of claim 1, wherein all of said steps are performed by said original speaker.

5. The method of claim 1, wherein some of said steps are performed by said original speaker and others of said steps are performed by at least one person other than said original speaker.

6. The method of claim 1, wherein:

said step (a) is performed by said original speaker; and, said step (c) is performed by a person other than said original speaker.

7. The method of claim 1, further comprising the step of: (e) re-recording said baseforms for said newly added words.

8. The method of claim 7, wherein all of said steps are performed by said original speaker.

9. The method of claim 7, wherein said steps are performed by said original speaker and at least one person other than said original speaker.

10. The method of claim 7, wherein:

said steps (a) and (e) are performed by said original speaker; and, said step (c) is performed by a person other than said original speaker.

11. A method for updating an original speaker's speech file in a speech application, comprising the steps of:

(a) creating a recognition file during a speech recognition session using said original speaker's language model on a first machine and with a first user identification;

(b) correcting misrecognition errors from said speech recognition session;

(c) creating a file log of corrections, including changes to said language model and baseforms for newly added words, during said correction session; and, (d) updating a recognition file on a second machine.

12. The method of claim 11, further comprising the step of: (e) re-recording baseforms for newly added words.

* * * * *